(12) United States Patent
Williamson et al.

(10) Patent No.: US 7,534,344 B2
(45) Date of Patent: May 19, 2009

(54) UPFLOW FILTRATION AND METHOD APPARATUS FOR STORMWATER TREATMENT

(75) Inventors: J. Kelly Williamson, 2733 Kanasita Dr., Chattanooga, TN (US) 37343; Eric Rominger, Chattanooga, TN (US)

(73) Assignees: AquaShield, Inc., Chattanooga, TN (US); J. Kelly Williamson, Chattanooga, TN (US)

( * ) Notice: Subject to any disclaimer, the term of this patent is extended or adjusted under 35 U.S.C. 154(b) by 0 days.

(21) Appl. No.: 11/763,982

(22) Filed: Jun. 15, 2007

(65) Prior Publication Data

US 2007/0289908 A1    Dec. 20, 2007

Related U.S. Application Data

(60) Provisional application No. 60/814,438, filed on Jun. 16, 2006.

(51) Int. Cl.
*B01D 36/04*    (2006.01)

(52) U.S. Cl. ............... 210/170.03; 210/305; 210/311; 210/433.1; 210/451; 210/532.1

(58) Field of Classification Search .............. 210/163, 210/164, 170.03, 299, 305, 311, 433.1, 434, 210/435, 451, 521, 532.1
See application file for complete search history.

(56) References Cited

U.S. PATENT DOCUMENTS

| | | | | |
|---|---|---|---|---|
| 5,322,629 | A * | 6/1994 | Stewart ................. | 210/170.03 |
| 6,190,545 | B1 * | 2/2001 | Williamson ................. | 210/305 |
| 6,315,897 | B1 * | 11/2001 | Maxwell ................. | 210/170.03 |
| 6,524,473 | B2 * | 2/2003 | Williamson ............ | 210/170.03 |
| 7,083,721 | B2 * | 8/2006 | McClure et al. ............. | 210/163 |
| 7,294,256 | B2 * | 11/2007 | Happel et al. .......... | 210/170.03 |
| 2003/0089652 | A1 * | 5/2003 | Matsui et al. ................ | 210/163 |
| 2004/0251185 | A1 * | 12/2004 | Pitt et al. ..................... | 210/163 |
| 2006/0006125 | A1 * | 1/2006 | Tolmie et al. ................ | 210/521 |
| 2006/0157428 | A1 * | 7/2006 | Brody ..................... | 210/532.1 |
| 2006/0163147 | A1 * | 7/2006 | Dierkes et al. .............. | 210/446 |

* cited by examiner

*Primary Examiner*—Christopher Upton
(74) *Attorney, Agent, or Firm*—Miller & Martin PLLC

(57) ABSTRACT

An upflow stormwater filter has horizontally aligned filter media to provide a high throughput for treatment of contaminated water, longer life to filter media, and without material head drop.

12 Claims, 1 Drawing Sheet

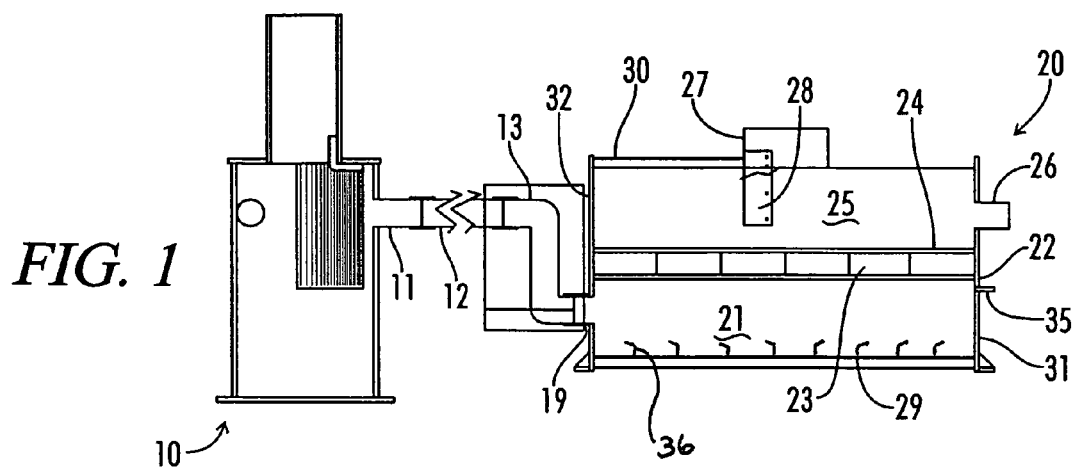
FIG. 1
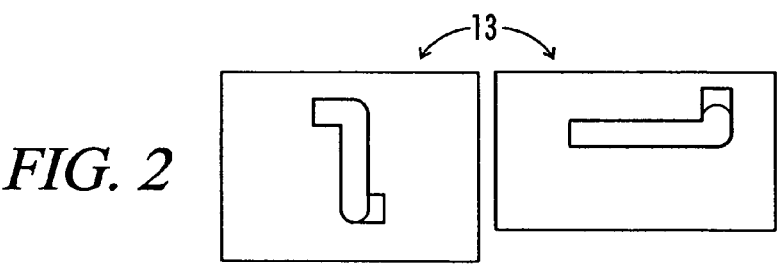
FIG. 2
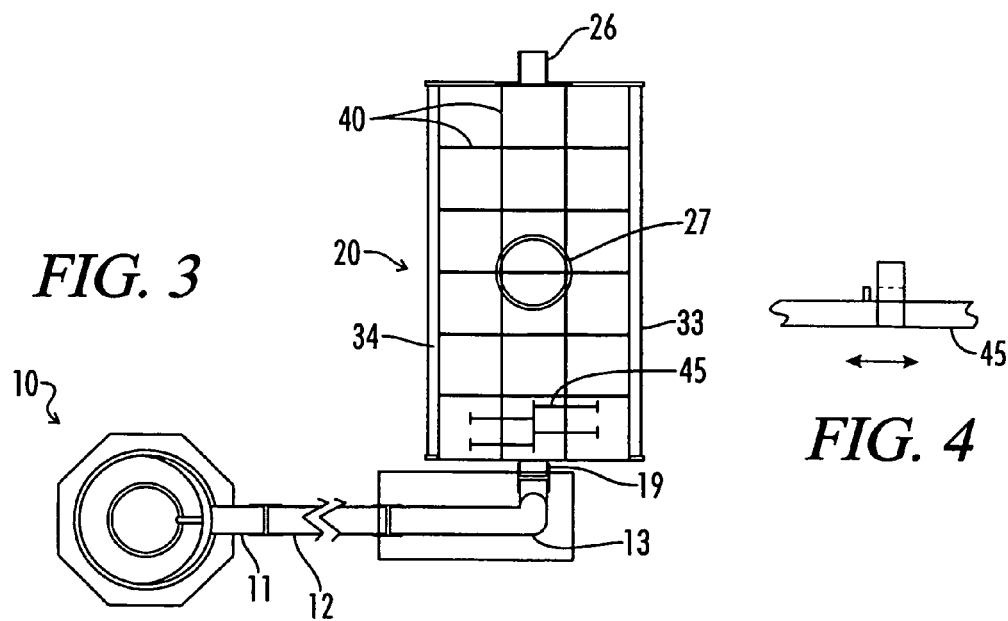
FIG. 3
FIG. 4

UPFLOW FILTRATION AND METHOD APPARATUS FOR STORMWATER TREATMENT

The present application claims priority to the Jun. 16, 2006 filing date of U.S. provisional patent application Ser. No. 60/814,438.

FIELD OF THE INVENTION

The present invention relates generally to the treatment of stormwater and provides for filtration of stormwater, preferably subsequent to an initial gravitational treatment to filter and possibly treat contaminants remaining in the storm water.

BACKGROUND OF THE INVENTION

It is known that residue from oil and gasoline spills at service stations, parking lots, and similar sites commonly remain at the site of the spill until washed away by water from rainfall or hose cleaning operation. The residue is often washed to a drain where it is likely to be carried to and mixed with the water supply from which drinkable water is ultimately taken. The protection of ground water and natural bodies of water requires systems for diverting or treating the water that contacts parking lots, roadways and other contaminated structures. Similar problems and environmental concerns arise at alternative sites generating waste water, and these various sources of contaminated water will generally be referred to as stormwater for the purposes of this application.

The stormwater may contain a variety of contaminants, including floating particulate such as plastics, or volatile fluids such as gas and oil residue that will tend to float on stationary water; non-floating particulate such as sand, silt and pebbles; and entrained contaminants such as fertilizer or other various organic or inorganic contaminants that may have leeched from upstream sites.

In order to effectively treat stormwater, it is often desirable to have multiple separation stages and, most typically, a preliminary mechanical separation phase that removes the heavier-than-water particulates and lighter-than-water contaminants, followed by a filtration phase which is designed to remove entrained contaminants or contaminants that could not be gravitationally separated.

In the prior art, a typical first stage separation apparatus would be the AquaSwirl Separator described in U.S. Pat. No. 6,524,473, or comparable products offered by Contech Stormwater Solutions, such as the Hydrodynamic Separation products, or the StormScreen or VortCapture screening products.

At the filtration stage, many products such as StormFilter and VortFilter products from Contech Stormwater Solutions, utilize cartridges which inherently restrict the maximum volume of water flow. Other filtration devices, such as the Aqua-Filter components described in U.S. Pat. No. 6,190,545, utilize horizontal filter beds and rely upon gravity to urge the water downward through filter media to effect treatment. Inherent in the use of gravitational urged or down flow filtration is some loss of head since the water level of the filtered stormwater is inherently lower than the unfiltered water by at least the height of the filter media. Furthermore, as the untreated stormwater is filtered downward through the filter media, particulates remain on the top surface of that filter media, tending to more rapidly clog the filtration media than would be necessary if particulate matter were removed.

It is desirable to utilize the horizontal filter configuration because of the greatly enhanced flow rates that can be maintained through such media in comparison to canister or other alternative arrangements.

SUMMARY OF THE INVENTION

Therefore, it is an object of the present invention to provide a new and improved filtration apparatus that operates in upflow mode.

It is another object of the invention to provide a filtration apparatus which minimizes head loss.

It is yet another object of the invention to provide a filtration apparatus which does not clog as frequently as downflow or gravitational filtration devices.

It is a further object of the invention to provide a high flow rate filtration apparatus for stormwater treatment.

These and other objects are achieved with the present upflow filter which is positionable in a drainage system having an upstream separator through which stormwater enters and then exits through a connecting pipe portion and enters a lower holding section of the upflow filter until head builds up sufficiently to urge the water upward through filtration media and filtered water exits the upflow filter by a downstream pipe portion. An opening is provided at the top of the upflow filter so that periodic service may be performed, including replacing filter media and removing accumulated particulates from the lower holding portion of the apparatus.

BRIEF DESCRIPTION OF THE DRAWINGS

FIG. 1 is a side plan view of an upflow filter connected to a hydrodynamic separation device according to the invention.

FIG. 2 is a detailed illustration of the elbow connector between the hydrodynamic separator and the upflow filter.

FIG. 3 is a top plan view of the upflow filter connected to the hydrodynamic separator.

FIG. 4 is a detailed view of the locking rods forming a grid on which the filter media rests.

DETAILED DESCRIPTION OF THE ILLUSTRATED EMBODIMENT

Turning first to FIG. 1, there is an illustrated embodiment of a hydrodynamic gravitational separator 10 with outlet drain 11 affixed to connecting pipe 12, which in turn connects to elbow inlet connector 13 which after approximately three feet of downward orientation connects with filter inlet 19 leading water into a lower cavity such as holding section 21. After sufficient head builds, the water level in holding section 21 rises to bottom fiberglass grating 22 and thence upward into filter media 23 and above into an upper cavity such as outflow area 25, and finally out exit drain 26. At the top of filter 20 is a manway 27 with a downwardly extending ladder 28 to provide easy servicing of the filter 20 when necessary to replace filter media 23 or to clean holding area 21 from accumulated particulates.

In operation, the mechanically treated stormwater enters the holding area 21 through inlet 19. When there is a stormwater event, the water rises and, to the extent water passes upward through filter media 23, it may reach a height sufficient to flow out of exit outlet 26 either for release into the environment or for further treatment.

After the stormwater event, a substantial body of water remains within filter 20 and as the water remains at rest within filter 20, particulate matter that may have been urged upward against the filter media 23 will be drawn downward by gravity to rest on the base 29 of filter 20. The filter is preferably rectangular in shape defined by a bottom or base wall 29, top 30 and four connecting walls therebetween including front wall 32 which holds the opening for inlet 19, opposed side walls 33, 34, and rear wall 22 with outlet 26. The base 29 may be advantageously fitted with easily cleaned or removable baffles 36 to entrap, entrain, or otherwise minimize the resuspension of particulates that settle between stormwater events. The presently preferred baffles operate in a louvered fashion to close during high flow rates and open during low or no flow conditions.

Also shown on rear wall 31 is bleed pipe 35. The bleed pipe may have many alternative configurations but it is provided so that at the end of a stormwater event, stormwater that is within the filter media or in the upper area 25 of the filter but has not achieved sufficient elevation to exit through outlet 26 is able to gradually exit filter 20 through the bleed opening. The bleed opening is preferably screened so that the escaping water is not unfiltered, although filtration may not be as thorough as that provided by passing through filter media 23. The size of the bleed opening is such that in full flow operation, only a minimal amount of water exits through this mechanism, generally less than 1 gallon per minute and in some cases only about 0.5 or 0.1 gallons per minute, and often only about 0.1 or 0.2 gallons per minute.

The structure of the grating includes trusses 40 extending laterally and longitudinally across the filter 20 on which fiberglass grating preferably approximately two foot square is placed. Filter media is placed on top of fiberglass grating, additional fiberglass grating is placed on top of the filter media, and locking rods 45 are utilized to secure the fiberglass grates against upward pressure exerted during stormwater events.

The filter media can be any filter media used in stormwater applications, including vermiculite, sand, mature leaf mulch and the like. Furthermore, the filter media may be treated with antimicrobial compositions or other additives depending upon the characteristics of the stormwater waste water that is to be treated. Utilizing the horizontal filter configuration disclosed in FIGS. 1 and 3, it is possible to achieve water treatment rates of at least about five, and even six, seven, eight, nine, ten, twelve, fourteen, sixteen, eighteen and twenty gallon per minute per square foot treatment rates. Thus, a filter having 36 square feet of filter area might filter 720 gallons per minute of mechanically treated stormwater. At the end of a stormwater event, after, or even while the bleed opening is allowing the water level within the filter to recede below the height of the filter media 23, particulate matter that has been urged upward against the filter media may begin to settle downward into the bottom of holding chamber 21 together with finer particulate matter remaining in the retained water.

Even though the upflow device encourages longer life for filter media, routine service is still necessary and access is provided through manhole 27 and ladder 28 descending downward within filter chamber. The locking rods 45 may be removed and upper fiberglass grating and filter media removed and replaced with fresh media periodically, such as every six to twelve months depending upon the number and severity of stormwater events. Furthermore, bottom grating can be removed to allow access to the holding area 21 where retained sediment and particulate matter may be removed.

It will be noted in FIG. 1 that the outlet 11 from mechanical separator 10 is at approximately the same elevation as outlet 26 from filter 20. Thus, utilizing upflow filter design not only can high flow throughput rates be obtained, but there is also no necessity of any material head drop or change in elevation from the input of the mechanical treatment device 10 to the outlet 26 of the upflow filter 20.

All publications, patents, and patent documents are incorporated by reference herein as though individually incorporated by reference. Although preferred embodiments of the present invention have been disclosed in detail herein, it will be understood that various substitutions and modifications may be made to the disclosed embodiment described herein without departing from the scope and spirit of the present invention as recited in the appended claims.

We claim:

1. An upflow separator comprising:
   (a) a chamber having top and bottom, with a lower cavity above the bottom, a filter bed above the lower cavity, and an upper cavity above the filter bed;
   (b) an inlet for stormwater feeding into the lower cavity;
   (c) an outlet for filtered stormwater from the upper cavity;
   (d) a bleed opening connected near the bottom of the lower cavity having the size significantly smaller than the inlet.

2. The upflow filter of claim 1 wherein the top has a manway with removable cover and a ladder extending downward into the chamber.

3. The upflow filter of claim 1 wherein the filter media is suspended in a grating between the lower cavity and the upper cavity.

4. The upflow filter of claim 3 wherein the grating above the filter media may be unlocked and removed when changing the filter media.

5. The upflow filter of claim 1 wherein the filter media is selected from the group comprising vermiculite, sand, and leaf mulch.

6. The upflow filter of claim 1 wherein the filter media is treated with an anti-microbial composition.

7. The upflow filter of claim 1 wherein the filter media is treated with additives selected to remediate contaminants in the stormwater.

8. The upflow filter of claim 1 wherein baffles are mounted near the bottom to retard the resuspension of settled particulates.

9. The upflow filter of claim 8 wherein the baffles are operable between a closed or trapping position during high flow conditions and an open particulate receiving position during no flow conditions.

10. The upflow filter of claim 1 wherein stormwater is fed into an inlet connector having about the same relative height as the outlet from the upper cavity, wherein the inlet connector extends downward to the inlet for the lower cavity.

11. The upflow filter of claim 1 wherein the bleed opening has a flow rate of less than 0.1, 0.2, 0.5 or 1.0 gallons per minute.

12. An upflow separator comprising:
   (a) a chamber having top and bottom, with a lower cavity above the bottom, a filter bed above the lower cavity, and an upper cavity above the filter bed;
   (b) an inlet for stormwater feeding into the lower cavity;
   (c) an outlet for filtered stormwater from the upper cavity;
   (d) a bleed opening connected near the bottom of the lower cavity having the size significantly smaller than the inlet; and
   (e) operable during a stormwater event so that at least about 5, 6, 7, 8, 9, 10, 12, 14, 16, 18 or 20 gallons per minute of stormwater are treated per square foot of filter media surface.

* * * * *